(12) United States Patent
Abouelwafa et al.

(10) Patent No.: US 12,314,603 B2
(45) Date of Patent: May 27, 2025

(54) SELECTIVE CONNECTION OF CONTROLLERS TO A SINGLE-PORTED INPUT/OUTPUT DEVICE

(71) Applicant: HEWLETT PACKARD ENTERPRISE DEVELOPMENT LP, Spring, TX (US)

(72) Inventors: Ayman Abouelwafa, Folsom, CA (US); James David Preston, Houston, TX (US); Christopher David Thompson, Colorado Springs, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 171 days.

(21) Appl. No.: 18/194,804

(22) Filed: Apr. 3, 2023

(65) Prior Publication Data

US 2024/0329875 A1 Oct. 3, 2024

(51) Int. Cl.
*G06F 3/06* (2006.01)

(52) U.S. Cl.
CPC ............ *G06F 3/0658* (2013.01); *G06F 3/061* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,772,270 B1* | 8/2004 | Kurpanek | H04L 9/40 710/316 |
| 6,993,610 B2 | 1/2006 | Coffey et al. | |
| 7,200,711 B2* | 4/2007 | Valin | G11C 11/4072 711/106 |
| 8,352,653 B2 | 1/2013 | Fang et al. | |
| 10,191,669 B2 | 1/2019 | Pang et al. | |
| 11,068,421 B1* | 7/2021 | Tsai | G06F 3/0635 |
| 2009/0135314 A1* | 5/2009 | Hui | G02B 26/0833 348/771 |
| 2011/0107002 A1* | 5/2011 | Jones | G06F 13/4027 710/312 |
| 2023/0214334 A1* | 7/2023 | Kirkpatrick | G06F 3/0613 710/113 |

OTHER PUBLICATIONS

Microsemi, "Universal Backplane Management (UBM) White Paper", 2019, 9 pages.

(Continued)

*Primary Examiner* — Michael Sun
(74) *Attorney, Agent, or Firm* — Trop, Pruner & Hu, P.C.

(57) ABSTRACT

In some examples, an apparatus includes an extender with a first connector to a single-ported input/output (I/O) device, and a second connector to a connection plane connected to a plurality of controllers. The extender includes a multiplexer to selectively connect different controllers of the plurality of controllers to the single-ported I/O device based on a control input comprising a plurality of reset indications from respective controllers of the plurality of controllers. Each reset indication of the plurality of reset indications when asserted causes a reset of the single-ported I/O device, and the plurality of reset indications are to control the multiplexer.

20 Claims, 4 Drawing Sheets

(56) References Cited

OTHER PUBLICATIONS

Billy Tallis, "Marvell and HPE Introduce NVMe RAID Adapter for Server Boot Drives", AnandTech,, available online at <<https://www.anandtech.com/show/16141/marvell-and-hpe-introduce-nvme-raid-adapter-for-server-boot-drives>>, Oct. 6, 2020, 2 pages.
Marvell, "Marvell® 88NR2241-B NVMe RAID 1 Accelerator", Solutions Brief, Jul. 2021, 2 pages.
Maxim Integrated, "2:1 Active-Active Multiplexer, Serial ATA 1:2 Port Multiplier, and Serial ATA 2:1 Port Selector," Feb. 6, 2019, 2 pages.

* cited by examiner

SELECTIVE CONNECTION OF CONTROLLERS TO A SINGLE-PORTED INPUT/OUTPUT DEVICE

BACKGROUND

A system can include storage devices that are accessible by controllers. A storage device includes a storage medium to store data. In some cases, a storage device may be accessed by multiple controllers. For example, in a redundancy arrangement, access of the storage device is managed by a primary controller and a standby controller can take over management of access of the storage device in case of failure of the primary controller.

BRIEF DESCRIPTION OF THE DRAWINGS

Some implementations of the present disclosure are described with respect to the following figures.

Figure 1:
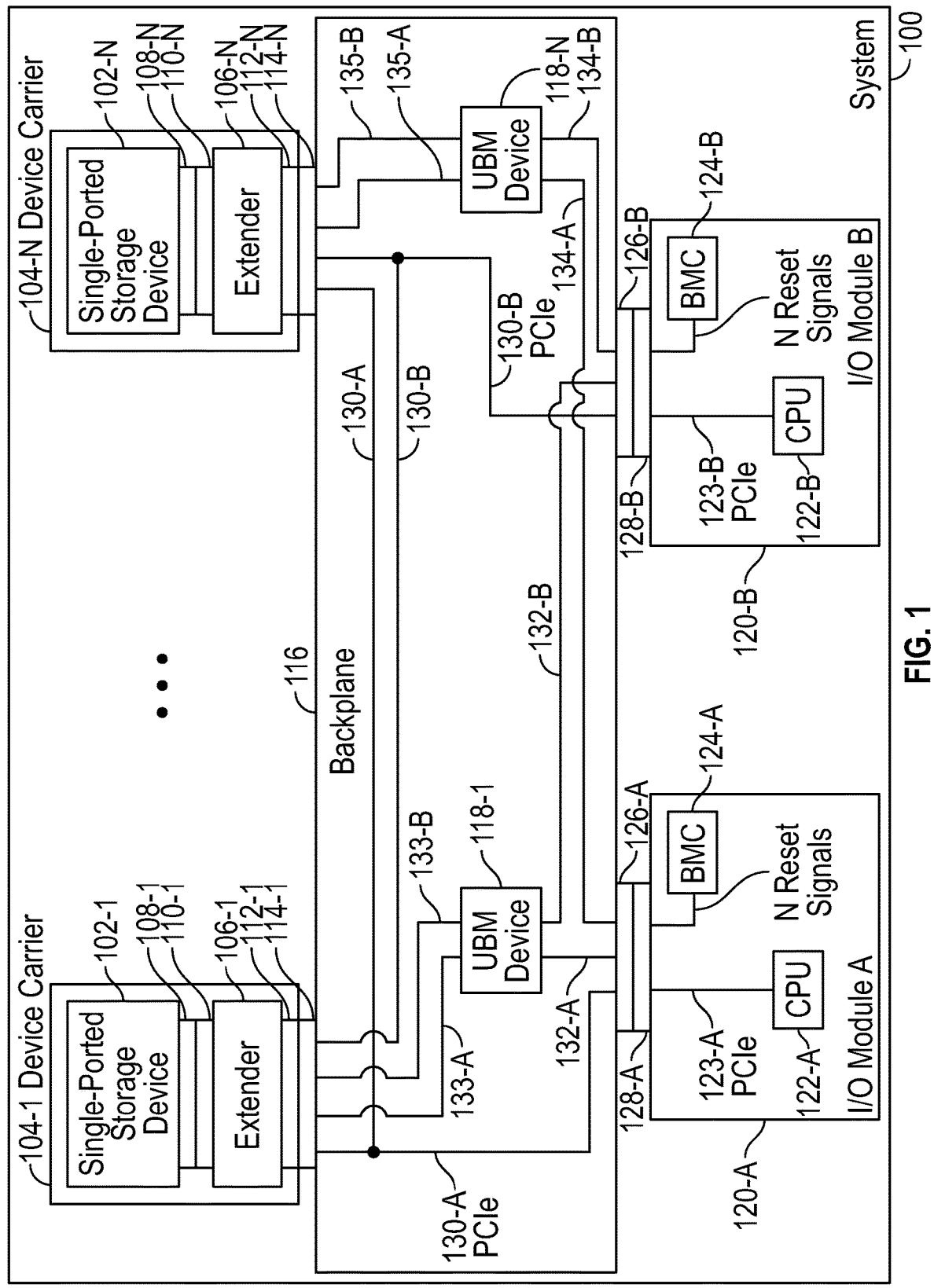
FIG. 1 is a block diagram of an arrangement that includes multiple input/output (I/O) modules and single-ported storage devices connected by a backplane, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, dual-ported storage devices can be used to allow access by two controllers, such as in a redundancy arrangement in which one of the two controllers is a primary controller and the other of the two controllers is a standby controller. The primary controller manages access of a dual-ported storage device while the standby controller remains inactive with respect to the dual-ported storage device. The primary controller can communicate with a first port of the dual-ported storage device, and the standby controller can communicate with a second port of the dual-ported storage device. In an example, a connection plane (e.g., a backplane, a midplane, etc.) can interconnect the controllers to the dual-ported storage device.

The connection plane includes buses over which the controllers are coupled to the ports of the dual-ported storage device. For example, the buses can include Peripheral Component Interconnect Express (PCIe) buses. A PCIe bus is a serial expansion bus for connecting electronic components of an electronic device. In other examples, buses can operate according to different protocols, whether standardized, open-source, or proprietary. Examples of other buses that can be used include any or some combination of the following: a Compute Express Link (CXL) bus, an InfiniBand bus, a HyperTransport bus, and so forth.

A dual-ported storage device can be relatively expensive, as compared to a single-ported storage device that has a single port. In a system with a large quantity of storage devices, use of dual-ported storage devices can lead to a relatively high cost of the system.

A "single-ported storage device" is a storage device with a single port through which the storage device can communicate with another device, such as a controller. Connecting multiple controllers to a single-ported storage device can be associated with various challenges that can lead to increased costs. For example, modifying a hardware infrastructure (e.g., a connection plane such as a backplane, midplane, etc.) of a system to support connection of multiple controllers to a single-ported storage device can be associated with increased development and manufacturing costs since personnel is involved in redesigning the hardware infrastructure and new components have to be sourced to provide the modified hardware infrastructure.

In accordance with some implementations of the present disclosure, techniques or mechanisms are provided to allow for selective connection of multiple controllers to a single-ported storage device. Techniques or mechanisms according to some examples of the present disclosure allow for selective connection of multiple controllers to the single-ported storage device by using a relatively low-cost passive multiplexer and by leveraging existing signals that are present in a hardware infrastructure (e.g., a connection plane such as a backplane, a midplane, etc.) of a system in which the controllers and single-ported storage device are present. A "passive" multiplexer is a multiplexer that operates without execution of machine-readable instructions on the multiplexer. In some examples, the hardware infrastructure used to connect multiple controllers to the single-ported storage device can be a hardware infrastructure designed for multi-ported storage devices, such as dual-ported storage devices. By leveraging such a hardware infrastructure for use in connecting controllers to single-ported storage devices, the design of the hardware infrastructure does not have to be changed, which simplifies the implementation of a storage system to employ single-ported storage devices.

As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

In some examples, an extender is provided to allow for the selective connection of different controllers to the single-ported storage device. The extender includes a multiplexer to selectively connect different controllers to the single-ported storage device based on a control input including a plurality of reset indications from respective controllers. The reset indications can include reset signals output by the controllers that when activated cause a reset of the single-ported storage device. The reset signals are signals that are already used and routed through a hardware infrastructure to the storage device. In some examples of the present disclosure, the reset signals from the controllers serve a dual purpose: (1) the reset signals are used to cause reset of the storage device, and (2) the reset signals are used to control the multiplexer in the extender. By leveraging the existing reset signals to also control the multiplexer in the extender, additional control signals would not have to be added for controlling the multiplexer; such additional control signals can change the hardware infrastructure and can lead to increased complexity and/or costs. In some examples, signals (including the reset signals) used in the hardware infrastructure can be according to a Non-Volatile Memory Express (NVMe) standard, which defines an interface for accessing storage devices over buses such as PCIe buses or other buses. Using NVMe signals to selectively control the multiplexer in the extender allows the hardware infrastructure over which the signals are propagated to conform to the NVMe standard. In other words, non-NVMe signals do not have to be provided for controlling the multiplexer in the extender—use of such non-NVMe signals would lead to a modification of the hardware infrastructure that may lead to increased complexity and/or costs.

Resetting a storage device can refer to placing the storage device in a reset state in which the storage device does not respond to an input stimulus including signals to access data of the storage device and/or signals to perform other operations with respect to the storage device. A reset signal can have an asserted state (e.g., an active low or active high state) and a de-asserted state (e.g., an inactive high or inactive low state). When asserted, the reset signal places the storage device in the reset state. When de-asserted, the reset signal allows the storage device to exit the reset state and become operational. More generally, a "reset indication" can refer to a reset signal or any other type of control information, such as a combination of bits that when set to a first value represents an asserted state and when set to a different second value represents a de-asserted state.

In further examples of the present disclosure, an output of the multiplexer in the extender that connects multiple controllers to a single-ported storage device is disabled responsive to multiple reset indications being concurrently de-asserted. Multiple reset indications from the multiple controllers being concurrently de-asserted is an error condition since that indicates that the multiple controllers may attempt to access the single-ported storage device at the same time, which can cause a fault or data error.

In the ensuing discussion, reference is made to single-ported storage devices. More generally, techniques or mechanisms according to some implementations of the present disclosure can be used with single-ported input/output (I/O) devices. An I/O device refers to a device that is capable of accepting input operations from another device (e.g., a controller) and/or producing output operations to another device (e.g., a controller).

FIG. 1 is a block diagram of an example system 100 that includes single-ported storage devices 102-1 to 102-N (N≥1). The system 100 can include one single-ported storage device, or alternatively, multiple single-ported storage devices. Examples of storage devices can include any or some combination of the following: a disk-based storage device, a solid-state drive, and so forth.

More generally, the single-ported storage devices can be replaced with other types of single-ported I/O devices. In other examples, any or some of the single-ported storage devices 102-1 to 102-N can be replaced with corresponding dual-ported (or more generally, multi-ported) storage devices. In such other examples, only one port of each multi-ported storage device is used—a multi-ported storage device in which only one port is used is effectively a single-ported storage device.

In an example, the system 100 is a storage system to store data accessible by requester devices (e.g., computers, smartphones, game appliances, wearable devices, Internet-of-Things (IoT) devices, vehicles, etc.). In other examples, the system 100 is a computing system such as a server system, a cloud system, and so forth.

Each of the single-ported storage devices 102-1 to 102-N is supported by respective device carrier. For example, the single-ported storage device 102-1 is supported by a device carrier 104-1, and the single-ported storage device 102-N is supported by a device carrier 104-N. A "device carrier" can refer to any physical support structure on which a single-ported storage device, or more generally, a single-ported I/O device, can be mounted. Examples of device carriers can include support frames, substrates, and so forth.

In accordance with examples of the present disclosure, each device carrier also supports a respective extender that allows multiple controllers to be connected to the corresponding single-ported storage device. For example, the device carrier 104-1 supports an extender 106-1, and the device carrier 104-N supports an extender 106-N. Each extender 106-$i$ (i equal 1 to N) includes a multiplexer (shown in FIG. 2) that is controlled to selectively connect multiple controllers to the respective single-ported storage device 102-$i$.

Each single-ported storage device 102-$i$ includes a respective single connector 108-$i$ through which the single-ported storage device 102-$i$ is to communicate with another device. A "connector" includes a collection of connection elements that allows circuitry of the single-ported storage device to be connected to a device external of the single-ported storage device. The connection elements can be in the form of electrical pins, pads, contacts, and so forth.

Each extender 106-$i$ has a device-side extender connector 110-$i$ that connects to the connector 108-$i$ of the single-ported storage device 102-$i$. For example, the extender 106-1 has a device-side extender connector 110-1 that connects to the connector 108-1 of the single-ported storage device 102-1, and the extender 106-N has a device-side extender connector 110-N that connects to the connector 108-N of the single-ported storage device 102-N.

Each extender 106-$i$ has a backplane-side connector 112-$i$ that connects to a device-side backplane connector 114-$i$ that is part of a backplane 116 of the system 100. As shown in FIG. 1, the backplane 116 includes device-side backplane connectors 114-1 to 114-N, to connect to corresponding backplane-side connectors 112-1 to 112-N of respective extenders 106-1 to 106-N.

In some examples of the present disclosure, the backplane 116 is an example of a hardware infrastructure designed for use with dual-ported storage devices. Using the extenders 106-1 to 106-N according to some examples of the present disclosure, the backplane 116 does not have to be modified to support use of single-ported storage devices. Further, the device-side backplane connectors 114-1 to 114-N do not have to be modified from designs used with dual-ported storage devices.

The backplane-side connector 112-$i$ on a first side of each extender 106-$i$ connects to the device-side backplane connector 114-$i$ that has contact elements designed for signals to two ports of a dual-ported storage device. The device-side extender connector 110-$i$ on a second side of each extender 106-$i$ connects to the single connector 108-$i$ of the single-ported storage device 102-$i$. Stated differently, each extender 106-$i$ sits between the single-ported storage device 102-$i$ and a backplane connector that supports a dual-ported storage device.

The backplane 116 is an example of a connection plane that includes signal paths to route signals between the device-side backplane connectors 114-1 to 114-N of the backplane 116 and module-side backplane connectors 128-A and 128-B of the backplane 116. The signal paths can be in the form of electrical traces or other types of electrical conductors on or in the backplane 116. As an example, the backplane 116 can be in the form of a circuit board that includes signal traces.

The backplane 116 can also include additional circuitry, such as in the form of Universal Backplane Management (UBM) devices 118-1 to 118-M. UBM is a standard for a backplane to allow controllers to interoperate with storage devices. In some examples, each UBM device 118-*i* is able to propagate sideband signals from controllers to a respective single-ported storage device 102-*i*, and more specifically in the context of FIG. 1, to the respective device carrier 104-*i* that supports the single-ported storage device 102-*i*. Sideband signals (e.g., NVMe signals) include reset signals from the controllers, as well as other types of sideband signals. Each UBM device 118-*i* can perform other functions according to the UBM standard.

The UBM device 118-1 is able to propagate reset signals to the device carrier 104-1, and the UBM device 118-N is able to propagate reset signals to the device carrier 104-N. A UBM device "propagating" a reset signal can refer to the UBM device passing through the reset signal without modification, or alternatively, the UBM device generating an output reset signal based on an input reset signal according to specified logic.

In other examples, a UBM device is not employed in the backplane 116. More generally, the backplane 116 includes circuitry to propagate reset signals from controllers to each device carrier 104-*i*.

In the example of FIG. 1, the controllers are in the form of I/O modules 120-A and 120-B. Each I/O module manages access of the single-ported storage devices 102-1 to 102-N. For example, an I/O module can receive an access request (e.g., read request or write request) from a requester device (not shown), which can be an electronic device coupled to the I/O module 120-A or 120-B (such as over a network or another link). In response to the access request, the I/O module can issue an access command to perform an access (e.g., read access or write access) of a target single-ported storage device, which can be any of the single-ported storage devices 102-1 to 102-N.

In the example of FIG. 1, it is assumed that there are two I/O modules 120-A and 120-B that are able to access each of the single-ported storage devices 102-1 to 102-N. In other examples, there can be more than two I/O modules.

In the example of FIG. 1, each I/O module includes a corresponding central processing unit (CPU) and a baseboard management controller (BMC). The I/O module 120-A includes a CPU 122-A and a BMC 124-A, and the I/O module 120-B includes a CPU 122-B and a BMC 124-B. Although reference is made to a BMC, more generally, each I/O module 121 or 122 can include a different type of management controller. Example details of a BMC are discussed further below.

In other examples, functionalities of the CPU and BMC can be combined into a single processor in each I/O module.

In some examples, each BMC 124-A or 124-B outputs N reset signals that cause reset of corresponding single-ported storage devices 102-1 to 102-N. More specifically, the BMC 124-A outputs the following reset signals: SD1_Reset_A, . . . , SDN_Reset_A. The reset signal SD1_Reset_A when asserted is to cause reset of the single-ported storage device 102-1, and the reset signal SDN_Reset_A when asserted is to cause reset of the single-ported storage device 102-N.

Similarly, the BMC 124-B outputs the following N reset signals: SD1_Reset_B, . . . , SDN_Reset_B. The reset signal SDN_Reset_B when asserted is to cause reset of the single-ported storage device 102-1, and the reset signal SDN_Reset_B when asserted is to cause reset of the single-ported storage device 102-N.

In some examples, one of the I/O modules 120-A and 120-B is a primary I/O module that actively controls access of the storage devices 102-1 to 102-N, while the other one of the I/O modules 120-A and 120-B is a standby I/O module that is in standby mode and does not actively control access of the storage devices 102-1 to 102-N. The standby I/O module can become active if the primary I/O module were to become unavailable for any reason.

The CPU 122-A or 122-B is to manage access of each of the single-ported storage devices 102-1 to 102-N. For example, the CPU 122-A or 122-B can issue access commands (e.g., read commands or write commands) to a target single-ported storage device, to perform an access (read or write) of the target single-ported storage device. The CPU 122-A or 122-B can issue the access command in response to receiving an access request from a requester device (not shown).

The I/O module 120-A includes an I/O module connector 128-A, and the I/O module 120-B includes an I/O module connector 128-B. The I/O module connectors 128-A and 128-B are connected to respective module-side backplane connectors 126-A and 126-B of the backplane 116. Signals of the CPU 122-A and the BMC 124-A are communicated over signal paths of the I/O module 120-A to the I/O module connector 128-A. Similarly, signals of the CPU 122-B and the BMC 124-B are communicated over signal paths of the I/O module 120-B to the I/O module connector 128-B.

The signals of the CPU 122-A can be communicated over a PCIe bus 123-A of the I/O module 120-A with the I/O module connector 128-A, and the signals of the CPU 122-B can be communicated over a PCIe bus 123-B of the I/O module 120-B with the I/O module connector 128-B.

The backplane 116 includes a PCIe bus 130-A that is connected between the module-side backplane connector 126-A and the device-side backplane connectors 114-1 to 114-N. Similarly, the backplane 116 includes a PCIe bus 130-B that is connected between the module-side backplane connector 126-B and the device-side backplane connectors 114-1 to 114-N. Each PCIe bus 130-A and 130-B is to communicate PCIe signals between a corresponding CPU 122-A or 122-B and a target single-ported storage device 102-*i*.

Although some examples discussed herein use PCIe buses, in other examples, other types of buses can be employed.

The backplane 116 also includes reset signal paths to route reset signals of the BMCs 124-A and 124-B to respective UBM devices 118-1 to 118-N. More specifically, a reset signal path 132-A of the backplane 116 carries the reset signal SD1_Reset_A between the module-side backplane connector 126-A and the UBM device 118-1, and a reset signal path 132-B of the backplane 116 carries the reset signal SD1_Reset_B between the module-side backplane connector 126-B and the UBM device 118-1. Similarly, a reset signal path 134-A of the backplane 116 carries the reset signal SDN_Reset_A between the module-side backplane connector 126-A and the UBM device 118-N, and a reset signal path 134-B of the backplane 116 carries the reset signal SDN_Reset_B between the module-side backplane connector 126-B and the UBM device 118-N.

In turn, the UBM device 118-1 propagates the reset signals SD1_Reset_A and SD1_Reset_B over respective reset paths 133-A and 133-B to the device-side backplane connector 114-1 of the backplane 116, and the UBM device 118-N propagates the reset signals SDN_Reset_A and SDN_Reset_B over respective reset paths 135-A and 135-B to the device-side backplane connector 114-N of the backplane 116.

The PCIe signals on the PCIe bus 130-A and the reset signals on the reset paths 133-A and 133-B are communicated with the extender 106-1 when the extender 106-1 is connected to the device-side backplane connector 114-1. Similarly, the PCIe signals on the PCIe bus 130-B and the reset signals on the reset paths 135-A and 135-B are communicated with the extender 106-N when the extender 106-N is connected to the device-side backplane connector 114-N.

Figure 2:
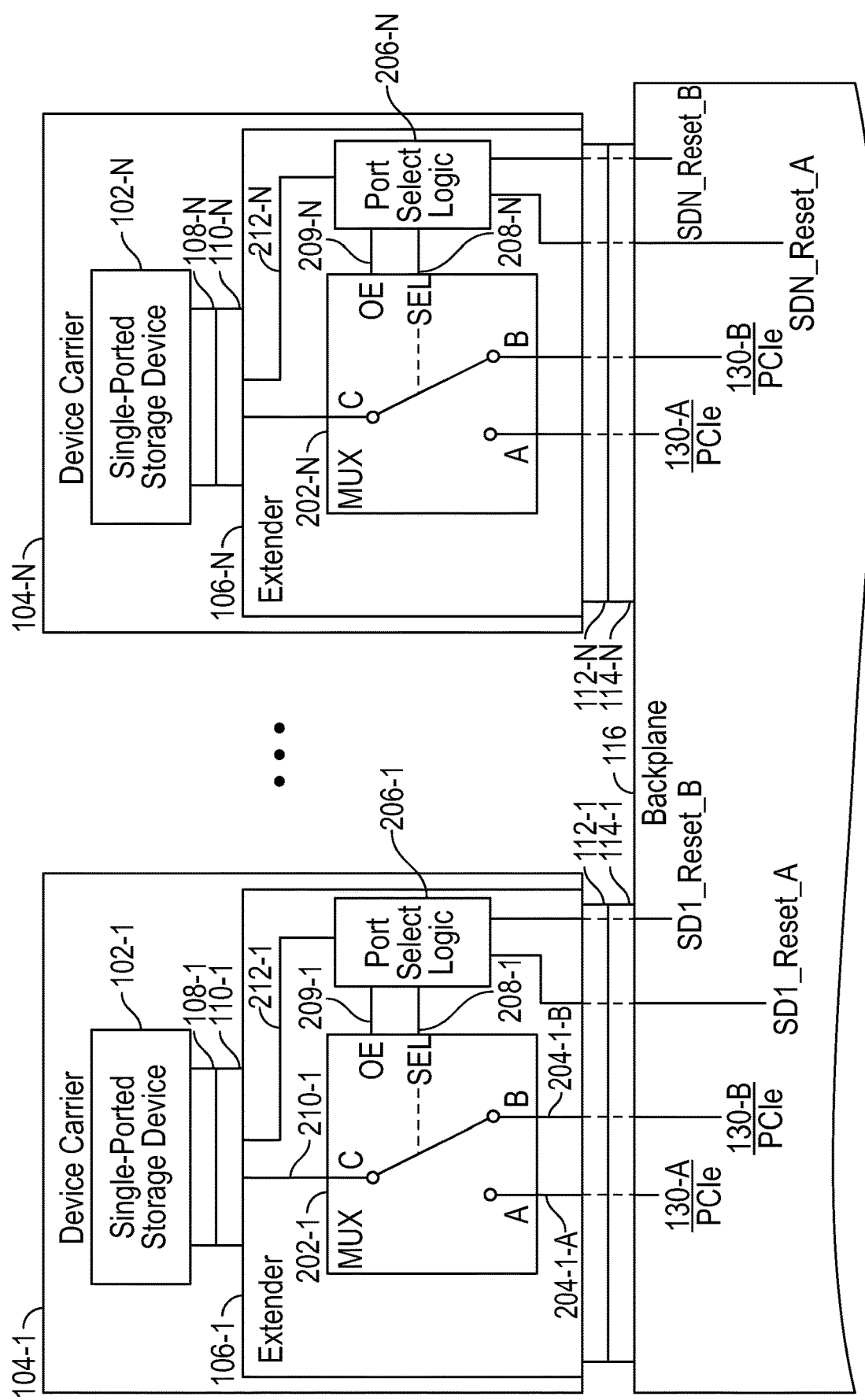
FIG. 2 is a block diagram of device carriers with respective single-ported storage devices and extenders connected to a backplane, in accordance with some examples.

Further details of each of the extenders 106-1 to 106-N are depicted in FIG. 2. The extender 106-1 includes a multiplexer 202-1, and the extender 106-N includes a multiplexer 202-N. In other examples, the multiplexers 202-1 to 202-N can have other configurations. The multiplexer 202-1 includes channels A and B that are on a first side of the multiplexer 202-1. Channels A and B of the multiplexer 202-1 are connected to the backplane-side connector 112-1 of the extender 106-1. The multiplexer 202-1 further includes channel C that is located on a second side of the multiplexer 202-1. Channel C of the multiplexer 202-1 is connected over a PCIe bus 210-1 of the extender 106-1 to the device-side connector 110-1 of the extender 106-1.

As used here, a "channel" of a multiplexer refers to a collection of signals (input signals and output signals) that are to be routed between the first side and the second side of the multiplexer 202-1. In the example of FIG. 2, channel A of the multiplexer 202-1 is connected over a PCIe bus 204-1-A of the extender 106-1 to the backplane-side connector 112-1, and channel B of the multiplexer 202-1 is connected over a PCIe bus 204-1-B of the extender 106-1 to the backplane-side connector 112-1. The PCIe bus 204-1-A of the extender 106-1 is connected through the connectors 112-1, 114-1 to the PCIe bus 130-A of the backplane 116 when the device carrier 104-1 is connected to the device-side backplane connector 114-1 the backplane 116. Similarly, the PCIe bus 204-1-B of the extender 106-1 is connected through the connectors 112-1, 114-1 to the PCIe bus 130-B of the backplane 116 when the device carrier 104-1 is connected to the device-side backplane connector 114-1 of the backplane 116.

The multiplexer 202-1 performs both a multiplexing function and a demultiplexing function. The multiplexing function of the multiplexer 202-1 includes selectively connecting input signals of channel A or channel B to channel C of the multiplexer 202-1 based on a state of a select input SEL of the multiplexer 202-1. The demultiplexing function of the multiplexer 202-1 includes selectively connecting output signals of channel C to channel A or channel B based on the state of the select input SEL of the multiplexer 202-1. "Input signals" of each of the channels A, and B are signals that are to be provided from the backplane 116 to the single-ported storage device 102-1, and "output signals" of channel C are signals to be provided from the single-ported storage device 102-1 to the backplane 116.

The select input SEL of the multiplexer 202-1 is connected to a select control signal 208-1 produced by a port select logic 206-1 in the extender 106-1. In some examples, the port select logic 206-1 can be implemented with a collection of logic gates (e.g., an exclusive-OR gate, an AND gate, an inverter, etc.). alternatively, the port select logic 206-1 can be implemented using an integrated circuit device.

The port select logic 206-1 receives as inputs the reset signals SD1_Reset_A and SD1_Reset_B through the connectors 112-1, 114-1. If the select control signal 208-1 is asserted (active low in the example of FIG. 2), then the multiplexer 202-1 selects channel B to connect to channel C. On the other hand, if the select control signal 208-1 is de-asserted (inactive high in the example of FIG. 2), then the multiplexer 202-1 selects channel A to connect to channel C.

The multiplexer 202-1 also includes an output enable input OE that controls whether output signals of channel C of the multiplexer 202-1 are enabled or disabled. If enabled, the output signals of channel C are driven based on corresponding signals of channel A or B connected by the multiplexer 202-1 to channel C. If disabled, the output signals of channel C remain in a disabled state in which the output signals of channel C remain inactive regardless of the states of the corresponding signals of channel A or B connected by the multiplexer 202-1 to channel C.

In the example of FIG. 2, the output enable input OE is connected to an OE control signal 209-1 produced by the port select logic 206-1. The port select logic 206-1 also produces a device reset signal 212-1 that is provided to the device-side extender connector 110-1 to control reset of the single-ported storage device 102-1.

Table 1 below summarizes how various signals (the select control signal 208-1, the OE control signal 209-1, and the device reset signal 212-1) produced by the port select logic 206-1 are based on the states of the reset signals SD1_Reset_A and SD1_Reset_B.

TABLE 1

| SD1_Reset_A | SD1_Reset_B | Select Control Signal | OE Control Signal | Device Reset Signal |
|---|---|---|---|---|
| 0 | 0 | x | 1 | 0 |
| 0 | 1 | B | 0 | 1 |
| 1 | 0 | A | 0 | 1 |
| 1 | 1 | x | 1 | 0 |

The device reset signal 212-1 is an active low signal in some examples. If the device reset signal 212-1 is active low, the single-ported storage device 102-1 is maintained in a reset state. On the other hand, if the device reset signal 212-1 is inactive high, the single-ported storage device 102-1 is allowed to exit the reset state and become operational.

According to Table 1, the device reset signal 212-1 is inactive high if just one of the reset signals SD1_Reset_A and SD1_Reset_B is active low, and the other one of the reset signals SD1_Reset_A and SD1_Reset_B is inactive high. The device reset signal 212-1 is active low if the reset signals SD1_Reset_A and SD1_Reset_B have the same state (i.e., both are active low or both are inactive high).

According to Table 1, if the reset signal SD1_Reset_A is active low and the reset signal SD1_Reset_B signal is inactive high, then the port select logic 206-1 asserts the select control signal 208-1 low, which causes the multiplexer 202-1 to select channel B to connect to channel C. If the reset signal SD1_Reset_A signal is inactive high and the reset signal SD1_Reset_B signal is active low, then the port select logic 206-1 de-asserts the select control signal 208-1 high, which causes the multiplexer 202-1 to select channel A to connect to channel C.

Although FIG. 2 shows an example in which the multiplexer 202-1 performs a 2-to-1 connection, more generally, the multiplexer 202-1 can perform an M-to-1 connection (M≥2) to selectively connect M controllers to a single-ported storage device. In such examples, the port select logic 206-1 can receive M reset signals from the backplane 116 to perform the control of the multiplexer 202-1 and the device reset signal 212-1.

The extender 106-N is similarly arranged as the extender 106-1, including the multiplexer 202-N and the port select logic 206-N. The port select logic 206-N receives as inputs the reset signals SDN_Reset_A and SDN_Reset_B, and produces the following outputs: select control signal 208-N that is provided to the select input SEL of the multiplexer 202-N, an OE control signal 209_N that is provided to the output enable input OE of the multiplexer 202-N, and a device reset signal 212-N that is provided to the device-side extender connector 110-N to control reset of the single-ported storage device 102-N.

Each CPU 122-A of the I/O module 120-A or CPU 122-B of the I/O module 120-B executes machine-readable instructions (referred to as "controller instructions") to perform tasks of the respective I/O module. The controller instructions can include firmware and/or software.

The port select logic 206-*i* of each extender 106-*i* is configured such that whichever I/O module (under control of the controller instructions executed on the respective CPU) de-asserts its reset signal gains control of the data path (that is part of the PCIe bus, for example) to the corresponding single-ported storage device 102-*i*. In this manner, dynamic and real time allocation of storage devices to the I/O modules can be performed simply by controlling reset signals to the corresponding storage devices after the system 100 powers on.

If both I/O modules 120-A and 120-B de-assert their reset signals to the same single-ported storage device 102-*i* (which can lead to bus contention by the I/O modules 120-A and 120-B), then the OE control signal 209-*i* is de-asserted high and the output enable input OE to the multiplexer 202-*i* is disabled and the multiplexer 202-*i* effectively disconnects both I/O modules 120-A and 120-B from the single-ported storage device 102-*i* to prevent bus contention. By using reset signals to control multiplexers in the extenders, the hardware infrastructure (e.g., the backplane 116) does not have to be modified to add additional control signals to control multiplexers. In some examples, the controller instructions on both I/O modules 120-A and 120-B can interact with one another to resolve the condition in which both reset signals are de-asserted (e.g., one of the I/O modules 120-A and 120-B can assert its reset signal to the single-ported storage device 102-*i* so that the other I/O module can manage access of the single-ported storage device 102-*i*). In other examples, an administrator or another entity can instruct one of the I/O modules 120-A and 120-B to asserts its reset signal to the single-ported storage device 102-*i* to resolve the condition in which both reset signals are de-asserted.

The controller instructions executed by the CPUs 122-A and 122-B of the I/O modules 120-A and 120-B can determine at runtime which I/O module is to access which single-ported storage devices 102-1 to 102-N. For example, the controller instructions executed by the CPU 122-A of the I/O module 120-A can determine that the I/O module 120-A is to manage access of a first subset of the single-ported storage devices 102-1 to 102-N, and the controller instructions executed by the CPU 122-B of the I/O module 120-B can determine that the I/O module 120-B is to manage access of a second subset of the single-ported storage devices 102-1 to 102-N. In a specific example, assume there are 24 single-ported storage devices. In an example, the first subset can include storage devices 1 to 12, and the second subset can include storage devices 13 to 24. In such an example, the I/O module 120-A "owns" the first subset including storage devices 1 to 12, and the I/O module 120-B owns the first subset including storage devices 13 to 24.

In some examples, the determination of which storage devices are owned by a given I/O module can be based on any or some combination of the following: (1) configuration information stored in a nonvolatile memory of the given I/O module, where the configuration information identifies the storage devices that are to be managed by the given I/O module, (2) rules or other criteria such as based on workload, bandwidth, and/or other factors that govern how a collection of storage devices are to be split among I/O modules, (3) input from a human administrator, and so forth.

Once the controller instructions of the given I/O module determine that the given I/O module owns a respective subset of the storage devices, the controller instructions of the given I/O module can de-assert the reset signals to the respective subset of the storage devices. The other I/O module maintains its reset signals to the respective subset of the storage devices in the asserted state.

During operation, a first I/O module of the I/O modules 120-A and 120-B may experience a fault or failure that prevents the first I/O module from functioning properly. A second I/O module of the I/O modules 120-A and 120-B can detect that the first I/O module is no longer functioning. In an example, this can be based on heartbeat messages sent from the first I/O module to the second I/O module. If the second I/O module stops receiving heartbeat messages from the first I/O module, the second I/O module can make a determination that the first I/O module is no longer functioning. In other examples, other mechanisms can be employed for detecting that an I/O module has stopped functioning.

In response to detecting that the first I/O module has stopped functioning, a failover is performed from the first I/O module to the second I/O module. In the above example, if the first I/O module owned storage devices 1-12 prior to the handover, then after the handover the second I/O module will own the storage devices 1-12. Prior to the handover, the second I/O module maintains its reset signals to storage devices 1-12 in the asserted state. After the handover, the second I/O module can de-assert its reset signals to storage devices 1-12, to cause the multiplexers in the extenders connected to storage devices 1-12 to connect the second I/O module to storage devices 1-12. It is assumed that the reset signals of the non-functioning first I/O module are asserted once the first I/O module is shut down or otherwise disabled.

If the non-functioning first I/O module is later replaced with a new I/O module, then the new I/O module can reclaim ownership of storage devices 1-12 after the new I/O module establishes communication with the second I/O module and notifies the second I/O module that the ownership of storage devices 1-12 is to be transferred from the second I/O module to the new I/O module. To perform the transfer, the second I/O module can assert its reset signals to storage devices 1-12, while the new I/O module de-asserts its reset signals to storage devices 1-12.

Figure 3:
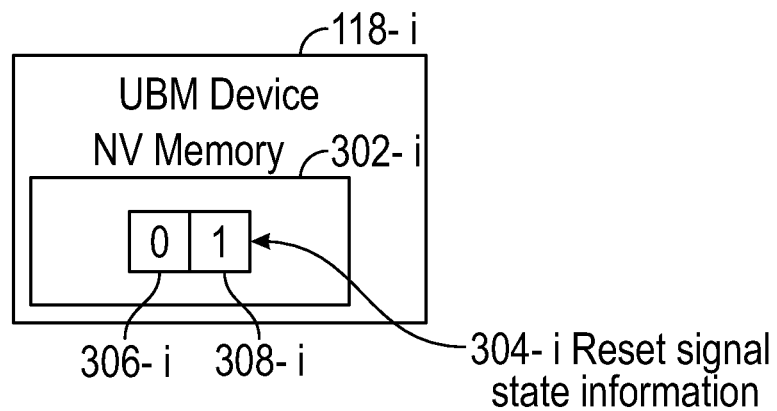
FIG. 3 is a block diagram of a Universal Backplane Management (UBM) device including a nonvolatile memory to store reset signal state information, in accordance with some examples.

In some examples in which the UBM devices 118-1 to 118-N are used, each UBM device can be used to persistently store respective states of reset signals from the I/O modules 120-A, 120-B to a respective single-ported storage device. FIG. 3 shows an example of a UBM device 118-*i* (i=1 to N) that includes a nonvolatile memory 302-*i*. The nonvolatile memory 302-*i* stores reset signal state information 304-*i*, which can include a first bit 306-*i* representing the state of the reset signal from the I/O module 120-A, and a second bit 308-*i* representing the state of the reset signal from the I/O module 120-B. In the example of FIG. 3, it is assumed that the first reset state bit 306-*i* is set to 0 (which indicates that the reset signal from the I/O module 120-A to the single-ported storage device 102-*i* is asserted), and the second reset state bit 308-*i* is set to 1 (which indicates that the reset signal from the I/O module 120-B to the single-ported storage device 102-*i* is de-asserted). The reset signal state information 304-*i* can be maintained in the nonvolatile memory 302-*i* across power cycles of the system 100.

In other examples, the nonvolatile memory 302-*i* that stores the reset signal state information 304-*i* can be included in another device different from the UBM device 118-*i*.

By persistently storing the reset signal state information 304-*i* in each nonvolatile memory 302-*i*, I/O modules can access the persistently stored reset signal state information 304-*i* after each power cycle or restart of the system 100 to determine which I/O module owns which single-ported storage device. For example, in FIG. 3, the reset signal state information 304-*i* indicates that the I/O module 120-B owns the single-ported storage device 102-*i* (since the reset state bit 308-*i* indicates that the reset signal from the I/O module 120-B was de-asserted).

The following are several possible scenarios that may be encountered in the system 100. In a first scenario, a single I/O module starts up (i.e., the other I/O module remains non-operational) in response to system startup. In the first scenario, if the controller instructions of the single I/O module detect the absence of the peer I/O module, the controller instructions of the single I/O module cause the single I/O module to de-assert its reset signals to all of the single-ported storage devices 102-1 to 102-N, so that the single I/O module can manage access of all the single-ported storage devices 102-1 to 102-N. In examples in which reset signal state information such as 304-*i* in FIG. 3 is persistently stored, the single I/O module can overwrite the reset signal state information such as 304-*i* to indicate that the single I/O module owns the respective single-ported storage device 102-*i*.

In a second scenario, both I/O modules 120-A and 120-B starts up in response to system startup. If this is the first time both I/O modules 120-A and 120-B are starting up such that the UBM devices 118-1 to 118-N do not store prior reset signal state information that represents a prior storage device assignment to I/O modules, there may be a time interval while the controller instructions are booting in the I/O modules 120-A and 120-B. During this time interval, the UBM devices 118-1 to 118-N can set the reset signal state information stored in the respective UBM devices 118-1 to 118-N to evenly split the storage devices 102-1 to 102-N between the I/O modules 120-A and 120-B. For example, if the reset signal state information 304-*i* was not previously programmed by an I/O module, the UBM device 118-*i* can set the reset signal state information 304-*i* to a default state. For example, the default state of the reset signal state information in the UBM device 118-1 can be {0,1} to indicate that the reset signal from the I/O module 120-A is asserted and the reset signal from the I/O module 120-B is de-asserted. On the other hand, the default state of the reset signal state information in the UBM device 118-N can be {1,0} to indicate that the reset signal from the I/O module 120-A is de-asserted and the reset signal from the I/O module 120-B is asserted. The state of the reset signal state information in each UBM device controls which reset signal is asserted and which reset signal is de-asserted to the respective storage device 102-*i*. By configuring the default states of the reset signal state information appropriately, an even split of the storage devices between the I/O modules 120-A and 120-B can be achieved.

Subsequently, after both I/O modules 120-A and 120-B complete their boot, the controller instructions running in the I/O modules 120-A and 120-B can determine the appropriate storage device ownership split, and can write the reset signal state information in the UBM devices 118-1 to 118-N accordingly.

In a third scenario, a single-ported storage device may be non-responsive to the I/O module owning the single-ported storage device. If the I/O module detects that the single-ported storage device is non-responsive, the I/O module can assert its reset signal to the single-ported storage device, followed by de-asserting the reset signal to the single-ported storage device. This sequence may cause the multiplexer in the corresponding extender to connect the single-ported storage device to the I/O module.

Alternatively, if a first I/O module detects that a given single-ported storage device owned by the first I/O module is non-responsive, the controller instructions of the first I/O module can communicate with the controller instructions of the second I/O module to request a transfer of ownership of the given single-ported storage device to the second I/O module. This transfer of ownership will cause the first I/O module to assert its reset signal to the given single-ported storage device, and the second I/O module to de-assert its reset signal to the given single-ported storage device.

In some examples, the controller instructions of the I/O modules 120-A and 120-B can intermittently rebalance ownership of the storage devices 102-1 to 102-N for workload balancing.

Figure 4:
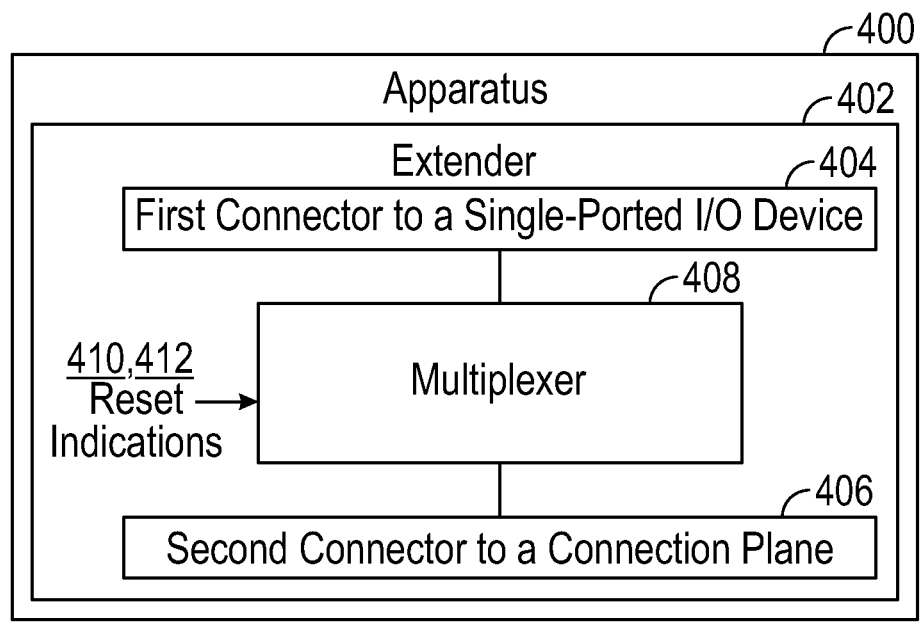
FIG. 4 is a block diagram of an apparatus including an extender according to some examples.

FIG. 4 is a block diagram of an apparatus 400 according to some examples. The apparatus 400 includes an extender 402, which can be any of the extenders 106-1 to 106-N of FIG. 1. Note that the apparatus 400 may be the extender 402, or alternatively, the apparatus 400 may be a larger structure that includes the extender 402. In the latter example, the apparatus 400 may be a device carrier, such as any of the device carriers 104-1 to 104-N.

The extender 402 includes a first connector 404 to a single-ported I/O device, and a second connector 406 to a connection plane connected to a plurality of controllers. An example of the connection plane is the backplane 116 of FIG. 1. Examples of the plurality of controllers include the I/O modules 120-A and 120-B of FIG. 1.

The extender 402 includes a multiplexer 408 to selectively connect different controllers of the plurality of controllers to the single-ported I/O device based on a control input. The control input includes a plurality of reset indications 410, 412 (e.g., SD1_Reset_A, SD1_Reset_B, SDN_Reset_A, SDN_Reset_B of FIG. 2) from respective controllers. Each reset indication of the plurality of reset indications when asserted causes a reset of the single-ported I/O device. The plurality of reset indications 410, 412 are also used to control the multiplexer 408, such as through a port select logic (e.g., 206-1 to 206-N in FIG. 2).

In some examples, an output of the multiplexer 408 is disabled responsive to multiple reset indications of the plurality of reset indications 410, 412 being concurrently de-asserted.

In some examples, the multiplexer 408 includes an output enable input that when set to a first state disables an output of the multiplexer 408. The output enable input is set to the first state responsive to the multiple reset indications being concurrently de-asserted.

In some examples, the apparatus 400 includes a port select logic to produce output signals (e.g., 208-1, 209-1, 212-1, 208-N, 209-N, 212-N of FIG. 2) to control the multiplexer, the port select logic having inputs connected to the plurality of reset indications.

In some examples, the first connector 404 has a reset signal connection element (an electrical pin, pad, contact, etc.) to provide a reset signal to the single-ported I/O device, where the reset signal connection element has a state based on a device reset signal (e.g., 212-1, 212-N of FIG. 2) produced by the port select logic.

In some examples, the second connector 406 has plural reset signal connection elements to receive respective reset indications of the plurality of reset indications 410, 412.

In some examples, the apparatus 400 includes a device carrier to support the extender, where the device carrier further includes a space to hold the single-ported I/O device.

Figure 5:
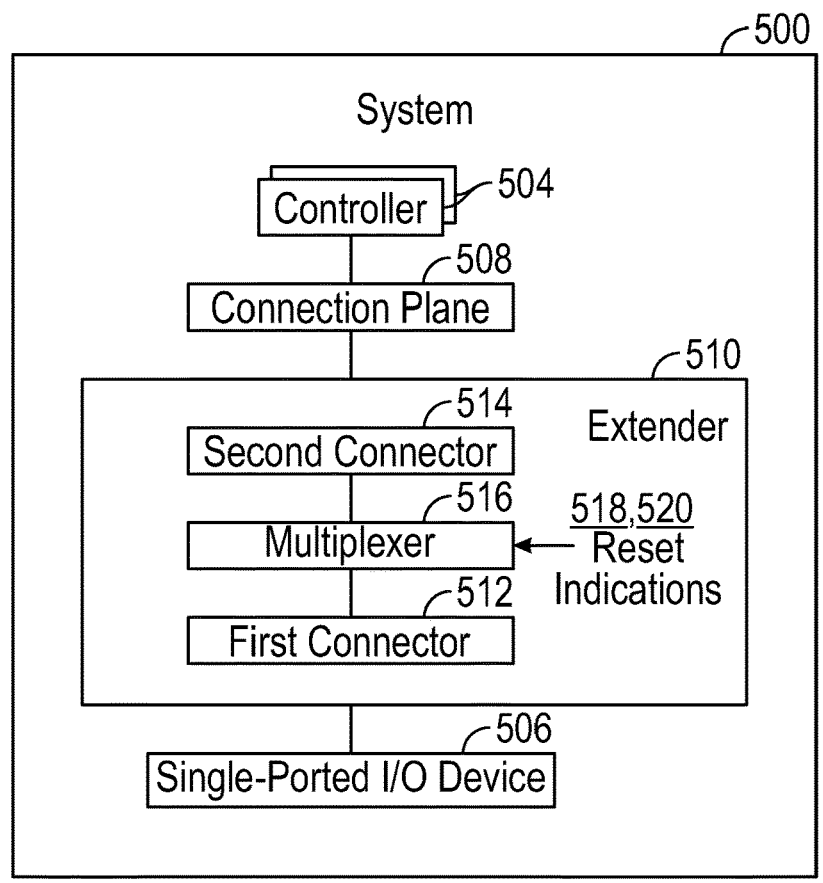
FIG. 5 is a block diagram of a system according to some examples.

FIG. 5 is a block diagram of a system 500. The system 500 includes a plurality of controllers 502, 504 for a single-ported I/O device 506. The system 500 includes a connection plane 508 connected to the plurality of controllers 502, 504.

The system 500 further includes an extender 510 to connect the plurality of controllers 502, 504 to the single-ported I/O device 506. The extender 510 has a first connector 512 to the single-ported I/O device 506, and a second connector 514 to the connection plane 508.

The extender 510 further includes a multiplexer 516 between the first connector 512 and the second connector 514. The multiplexer 516 selectively connects different controllers of the plurality of controllers 502, 504 to the single-ported I/O device 506 based on a control input that includes a plurality of reset indications 518, 520 from the respective controllers 502, 504. An output of the multiplexer 516 is disabled responsive to multiple reset indications of the plurality of reset indications 518, 520 being concurrently de-asserted.

A first controller of the plurality of controllers 502, 504 is to determine an ownership of the single-ported I/O device 506 and is to control a state of a respective reset indication of the plurality of reset indications 518, 520 based on the determination of the ownership of the single-ported I/O device 506.

In some examples, the first controller is to determine a first collection of single-ported I/O devices for which the first controller is an owner, and the first controller is to de-assert respective reset indications to the single-ported I/O devices of the first collection of single-ported I/O devices.

In some examples, a second controller of the plurality of controllers 502, 504 is to determine a second collection of single-ported I/O devices for which the second controller is an owner, and the second controller is to de-assert respective reset indications to the single-ported I/O devices of the second collection of single-ported I/O devices.

In some examples, the first controller and the second controller are to cooperate at runtime of the system to determine a split of ownership among a plurality of single-ported I/O devices.

In some examples, the connection plane 508 includes a nonvolatile memory (e.g., 302-i in FIG. 3) to store an indication of which of the plurality of controllers 502, 504 has ownership of the single-ported I/O device 506.

In some examples, the nonvolatile memory is to store states of the plurality of reset indications 518, 520.

In some examples, the multiplexer 516 includes an output enable input that when set to a first state disables an output of the multiplexer 516. The output enable input is set to the first state responsive to the multiple reset indications being concurrently de-asserted.

In some examples, the output enable input is set to a different second state responsive to a single reset indication of the plurality of reset indications 518, 520 being de-asserted, while a remainder of the plurality of reset indications 518, 520 is asserted.

Figure 6:
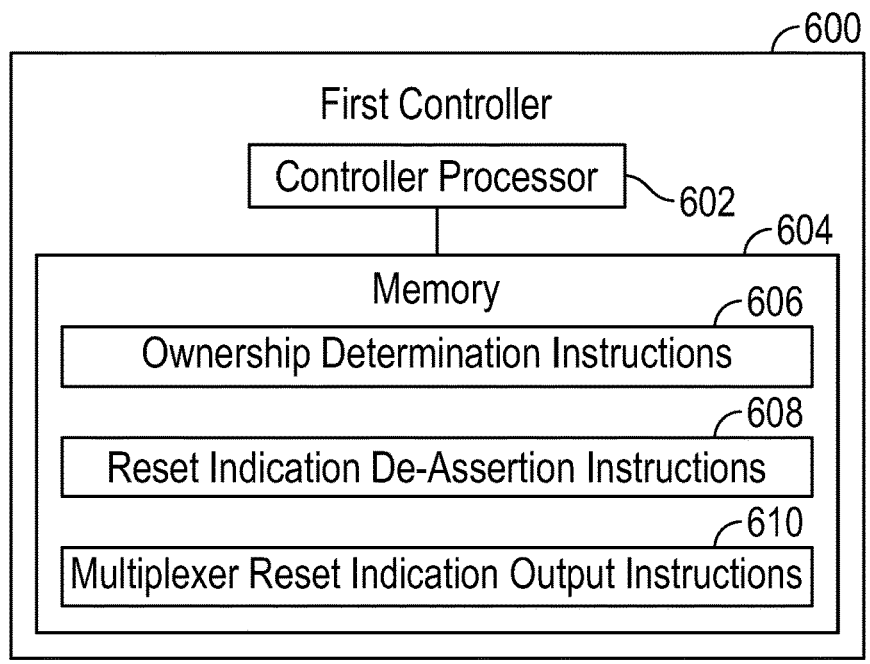
FIG. 6 is a flow diagram of a controller according to some examples.

FIG. 6 is a block diagram of a first controller 600 according to some examples. An example of the first controller 600 is one of the I/O modules 120-A and 120-B of FIG. 1. The first controller 600 includes a controller processor 602, and a memory 604 storing machine-readable instructions executable on the controller processor 602 to perform various tasks. A controller processor 602 can include a microprocessor, a core of a multi-core microprocessor, a microcontroller, a programmable integrated circuit, a programmable gate array, or another hardware processing circuit.

The machine-readable instructions include ownership determination instructions 606 to determine whether the first controller 600 is to manage access of a single-ported I/O device.

The machine-readable instructions include reset indication de-assertion instructions 608 to, based on determining that the first controller 600 is to manage access of the single-ported I/O device, de-assert a first reset indication to the single-ported I/O device. The first reset indication when asserted is to place the single-ported I/O device in a reset state.

The machine-readable instructions include multiplexer reset indication output instructions 610 to output the de-asserted first reset indication to control a multiplexer that is to selectively connect a plurality of controllers to the single-ported I/O device. The de-asserted first reset indication is to cause connection of the first controller to the single-ported I/O device through the multiplexer.

A "BMC" (e.g., the BMC 124-A or 124-B of FIG. 1) can refer to a specialized service controller that monitors the physical state of an electronic device (e.g., the I/O module 120-A or 120-B) using sensors and communicates with a remote management system (that is remote from the electronic device) through an independent out-of-band connection. The BMC can perform management tasks to manage components of the electronic device. Examples of management tasks that can be performed by the BMC can include any or some combination of the following: power control to perform power management of the electronic device (such as to transition the electronic device between different power consumption states in response to detected events), thermal monitoring and control of the electronic device (such as to monitor temperatures of the electronic device and to control thermal management states of the electronic device), fan control of fans in the electronic device, system health monitoring based on monitoring measurement data from various sensors of the electronic device, remote access of the electronic device (to access the electronic device over a network, for example), remote reboot of the electronic device (to trigger the electronic device to reboot using a remote command), system setup and deployment of the electronic device, system security to implement security procedures in the electronic device, and so forth.

In some examples, the BMC can provide so-called "lights-out" functionality for an electronic device. The lights out functionality may allow a user, such as a systems administrator, to perform management operations on the electronic device even if an OS is not installed or not functional on the electronic device.

Moreover, in some examples, the BMC can run on auxiliary power provided by an auxiliary power supply; as a result, the electronic device does not have to be powered on to allow the BMC to perform the BMC's operations. The auxiliary power supply is separate from a primary power supply that supplies powers to other components (e.g., a main processor, a memory, an input/output (I/O) device, etc.) of the electronic device.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
    an extender comprising:
        a first connector to a single-ported input/output (I/O) device,
        a second connector to a connection plane connected to a plurality of controllers, and
        a multiplexer comprising a select input connected to a control input based on a plurality of reset indications from respective controllers of the plurality of controllers, the multiplexer to selectively connect different controllers of the plurality of controllers to the single-ported I/O device based on the control input, wherein each reset indication of the plurality of reset indications when asserted causes a reset of the single-ported I/O device, and wherein the control input when set to a first state causes the multiplexer to connect a first controller of the plurality of controllers to the single-ported I/O device, and the control input when set to a second state causes the multiplexer to connect a second controller of the plurality of controllers to the single-ported I/O device.

2. The apparatus of claim 1, wherein an output of the multiplexer is disabled responsive to multiple reset indications of the plurality of reset indications being concurrently de-asserted.

3. The apparatus of claim 2, wherein the multiplexer comprises an output enable input that when set to a first state disables an output of the multiplexer, and wherein the output enable input is set to the first state responsive to the multiple reset indications being concurrently de-asserted.

4. The apparatus of claim 3, comprising a port select logic to produce output signals to control the multiplexer, the port select logic having inputs connected to the plurality of reset indications, wherein the control input is a control signal based on the plurality of reset indications, and the output signals from the port select logic comprise the control signal connected to the select input of the multiplexer, and an output enable signal connected to the output enable input of the multiplexer.

5. The apparatus of claim 4, wherein the first connector has a reset signal connection element to provide a reset signal to the single-ported I/O device, wherein the reset signal connection element has a state based on a device reset signal produced by the port select logic, and wherein the second connector has plural reset signal connection elements to receive respective reset indications of the plurality of reset indications.

6. The apparatus of claim 1, wherein the plurality of reset indications comprise reset signals according to a Non-Volatile Memory Express (NVMe) standard.

7. The apparatus of claim 1, wherein the multiplexer comprises a passive multiplexer that operates without execution of machine-readable instructions on the multiplexer.

8. The apparatus of claim 2, wherein the multiple reset indications being concurrently de-asserted represent a condition of bus contention by multiple controllers of the plurality of controllers for a bus to the single-ported I/O device, the plurality of reset indications comprise a first reset indication and a second indication, the control input is set to the first state when the first reset indication is de-asserted and the second indication is asserted, and the control input is set to the second state when the first reset indication is asserted and the second indication is de-asserted.

9. The apparatus of claim 1, wherein a reset indication of the plurality of reset indications being asserted represents a condition in which a respective controller of the plurality of controllers is not ready to use the single-ported I/O device.

10. The apparatus of claim 1, comprising:
    a device carrier to support the extender, the device carrier further comprising a space to hold the single-ported I/O device.

11. A system comprising:
    a plurality of controllers for a single-ported input/output (I/O) device;
    a connection plane connected to the plurality of controllers; and
    an extender comprising:
        a first connector to the single-ported I/O device,
        a second connector to the connection plane, and
        a multiplexer between the first connector and the second connector, the multiplexer comprising a select input connected to a control input based on a plurality of reset indications from respective controllers of the plurality of controllers, the multiplexer to selectively connect different controllers of the plurality of controllers to the single-ported I/O device based on the control input, wherein the control input when set to a first state causes the multiplexer to connect a first controller of the plurality of controllers to the single-ported I/O device, and the control input when set to a second state causes the multiplexer to connect a second controller of the plurality of controllers to the single-ported I/O device, wherein an output of the multiplexer is disabled responsive to multiple reset indications of the plurality of reset indications being concurrently de-asserted, and
    wherein the first controller is to determine an ownership of the single-ported I/O device and to control a state of a respective reset indication of the plurality of reset indications based on the determination of the ownership of the single-ported I/O device.

12. The system of claim 11, wherein the first controller is to determine a first collection of single-ported I/O devices for which the first controller is an owner, and the first controller is to de-assert respective reset indications to the single-ported I/O devices of the first collection of single-ported I/O devices.

13. The system of claim 11, wherein the second controller is to determine a second collection of single-ported I/O devices for which the second controller is an owner, and the second controller is to de-assert respective reset indications to the single-ported I/O devices of the second collection of single-ported I/O devices.

14. The system of claim 13, wherein the first controller and the second controller are to cooperate at runtime of the system to determine a split of ownership among a plurality of single-ported I/O devices.

15. The system of claim 11, wherein the connection plane comprises a nonvolatile memory to store an indication of which of the plurality of controllers has ownership of the single-ported I/O device.

16. The system of claim 15, wherein the nonvolatile memory is to store states of the plurality of reset indications.

17. The system of claim 11, wherein the multiplexer comprises an output enable input that when set to a first state disables an output of the multiplexer, and wherein the output enable input is set to the first state responsive to the multiple reset indications being concurrently de-asserted.

18. The system of claim 17, wherein the output enable input is set to a different second state responsive to a single reset indication of the plurality of reset indications being de-asserted, while a remainder of the plurality of reset indications is asserted.

19. A system comprising:
a control plane comprising signal paths to route a plurality of reset signals from respective controllers of a plurality of controllers; and
an extender comprising:
a first connector to a single-ported I/O device,
a second connector connected to the control plane, and
a multiplexer between the first connector and the second connector, the multiplexer comprising a select input connected to a control signal that is based on the plurality of reset signals from the respective controllers, the multiplexer to selectively connect different controllers of the plurality of controllers to the single-ported I/O device based on the control signal, wherein the control signal when set to a first state causes the multiplexer to connect a first controller of the plurality of controllers to the single-ported I/O device, and the control signal when set to a second state causes the multiplexer to connect a second controller of the plurality of controllers to the single-ported I/O device.

20. The system of claim 19, wherein the multiplexer comprises an output enable input that when set to a first state disables an output of the multiplexer, and wherein the output enable input is set to the first state responsive to multiple reset signals of the plurality of reset signals being concurrently de-asserted.

* * * * *